United States Patent [19]

Pickard et al.

[11] Patent Number: 5,220,909
[45] Date of Patent: Jun. 22, 1993

[54] SELF-HEATING INDIVIDUAL MEAL MODULE

[75] Inventors: Donald W. Pickard, Sherborn; Robert L. Trottier, Franklin, both of Mass.

[73] Assignee: The United States of America as represented by the Secretary of the Army, Washington, D.C.

[21] Appl. No.: 892,069

[22] Filed: May 28, 1992

[51] Int. Cl.⁵ .................................................. F24J 1/00
[52] U.S. Cl. ...................................... 126/263; 126/246
[58] Field of Search ............... 126/263, 262, 246, 261, 126/266, 204; 426/113, 114

[56] References Cited

U.S. PATENT DOCUMENTS

| | | | |
|---|---|---|---|
| 2,589,645 | 3/1952 | Tiegel | 126/263 |
| 3,059,633 | 10/1962 | Laerum | 126/262 |
| 3,512,516 | 5/1970 | Glass et al. | 126/263 |
| 4,771,761 | 9/1988 | Doukhan et al. | 126/263 |
| 4,777,930 | 10/1988 | Hartz | 126/246 |
| 4,928,474 | 5/1990 | Schirmer | 53/425 |
| 4,983,798 | 1/1991 | Eckler et al. | 126/246 |
| 5,117,809 | 6/1992 | Scaringe et al. | 126/263 |

*Primary Examiner*—James C. Yeung
*Attorney, Agent, or Firm*—Richard J. Donahue; Anthony T. Lane

[57] ABSTRACT

A self heating individual meal module includes a tub for holding a quantity of food to be heated. Below the tub is a tray containing an electrolytic-solution-activated exothermic-chemical pad and a pouch containing an electrolytic solution. The tub is welded to the tray and in contact with the pad. A pull-tab is attached to the pouch for opening the pouch so that the electrolytic solution inside the pouch can flow out to trigger the exothermic reaction in the pad so as to heat the tub containing the food. The tub and the tray are removably seated in a first paperboard carton which provides protection during storage and transportation and insulation during the heating process. The self heating individual meal module may also include a second paperboard carton having removably seated inside a quantity of bread, a beverage powder, a dessert, accessories and eating utensils. The two paperboard cartons may be glued together to provide a complete single serve meal.

1 Claim, 2 Drawing Sheets

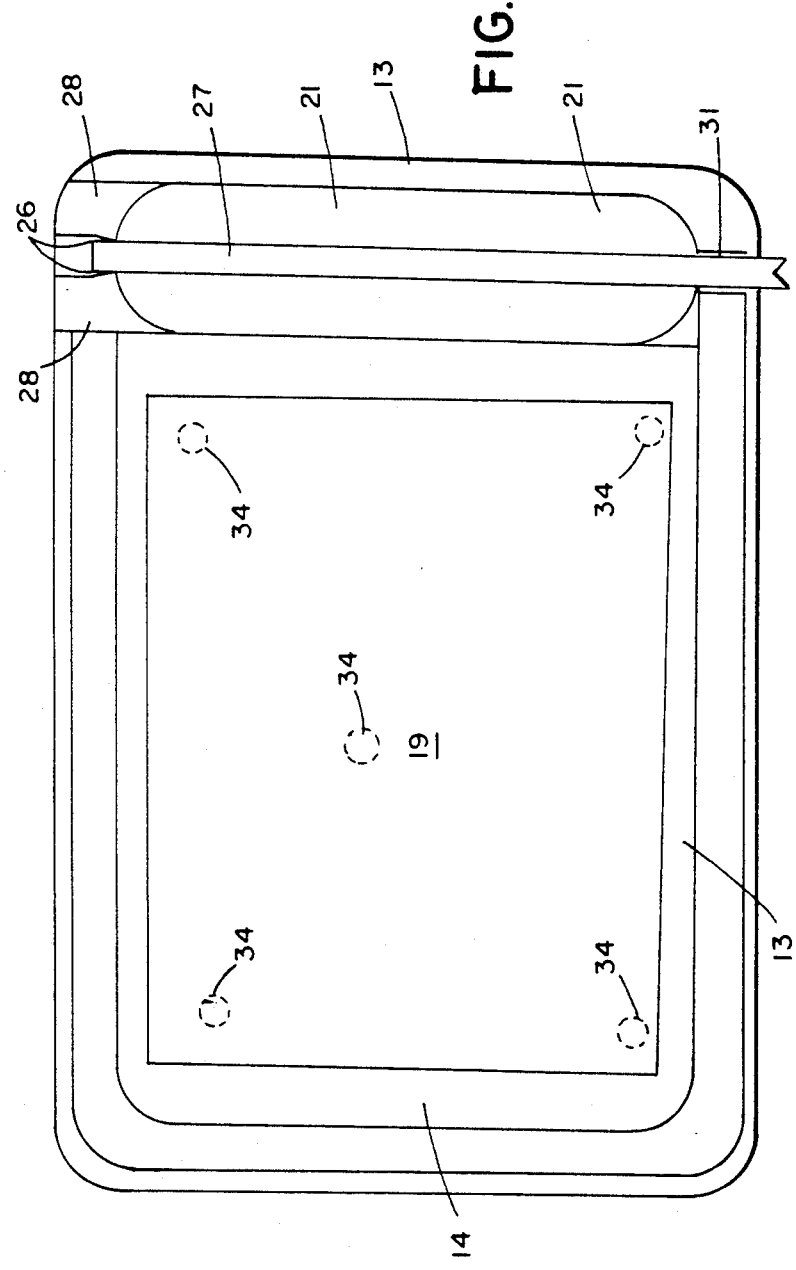
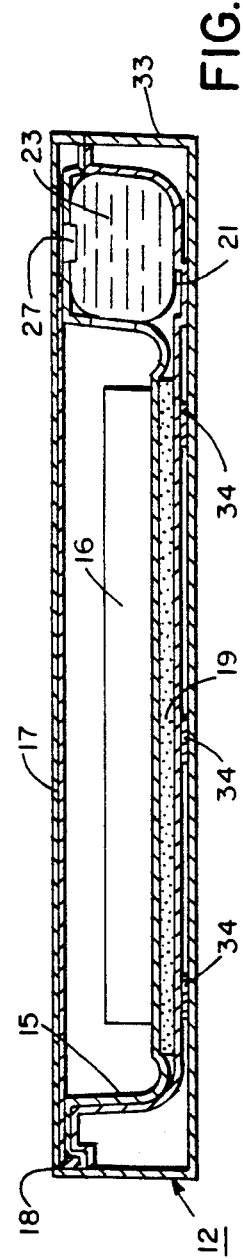

SELF-HEATING INDIVIDUAL MEAL MODULE

The invention described herein may be manufactured, used and licensed by or for the Government for Governmental purposes without the payment to us of any royalty thereon.

BACKGROUND OF THE INVENTION

The present invention relates generally to meal modules and more particularly to a novel self-heating individual meal module.

Self-heating meal modules of the type used, for example, by the military to heat rations of food for an individual are well-known.

One example of a self-heating meal module is described in U.S. Pat. No. 4,559,921, which issued Dec. 24, 1985 with inventor Benmussa. In this patent, there is disclosed a self-heating receptacle comprising a vessel for food to be heated, and below the vessel a sealed container containing two chemicals, e.g. quick lime and water. A pouch within the container holds one of the chemicals sealed from the other. A tearing filament secured to the pouch simultaneously opens the pouch and the container thereby to trigger the exothermic reaction to heat said food vessel. The pouch is suspended by its ends above the bottom of the container and is surrounded by said other chemical. There is an outer housing in the bottom of which the container is disposed, the food vessel being disposed in the top of this housing. The container is hermetically sealed with a lid. The tearing filament extends across the lid below the bottom of the food vessel and emerges from between the housing and the food vessel in a portion that can be grasped by the user to pull on the tearing filament thereby both to open the pouch and to tear the lid.

One disadvantage with the above-described self-heating receptacle is that it is designed so that the food vessel is separated by a gap of about 5 mm from the sealed container containing the quick lime and water. In this way, when the sealed container is opened and the quick lime and water are combined to initiate an exothermic reaction, steam is released therefrom, which then rises to heat the food vessel. Unfortunately, this form of heat transfer, i.e., convective heat transfer of a gas, is rather inefficient.

Other examples of self-heating meal modules are disclosed in the following patents: U.S. Pat. No. 4,819,612, which issued Apr. 11, 1989 with inventors Okamoto et al; U.S. Pat. No. 4,809,673, which issued Mar. 7, 1989 with inventor Charvin; U.S. Pat. No. 4,751,119, which issued Jun. 14, 1988 with inventor Yukawa; U.S. Pat. No. 4,510,919, which issued Apr. 16, 1985 with inventor Benmussa; U.S. Pat. No. 3,871,357, which issued Mar. 18, 1975 with inventors Grosso et al; U.S. Pat. No. 3,653,372, which issued Apr. 4, 1972 with inventor Douglas; U.S. Pat. No. 3,287,140 which issued Nov. 22, 1966 with inventor Brussell; and U.S. Pat. No. 1,751,387, which issued Mar. 18, 1930 with inventor Bielek.

In U.S. Pat. No. 4,522,190, which issued Jun. 11, 1985 with inventors Kuhn et al, there is disclosed an inexpensive flexible heater material (heat pad) for food heating, medical compresses and the like. The heat pad is a composite material consisting of a supercorroding metallic alloy powder dispersed throughout a porous polyethylene matrix. The supercorroding alloy material consists of a powered alloy of magnesium and iron which is produced by high energy power metallurgical milling techniques. Pressureless sintering of a mixture of the supercorroding alloy powders with UHMW polyethylene powder results in the formation of a flexible porous matrix material with active ingredients therein that are readily activated with a suitable electrolyte fluid.

SUMMARY OF THE INVENTION

It is an object of the present invention to provide a new self-heating individual meal module.

It is another object of the present invention to provide a self-heating meal module as described above which is designed to exhibit improved heat transfer efficiency as compared to that typically exhibited by existing self-heating meal modules.

Additional objects of the present invention will be set forth in part in the description which follows, and in part will be obvious from the description or may be learned by practice of the invention. The objects of the present invention may be realized and attained by means of the instrumentalities and combinations particularly pointed out in the appended claims.

To achieve the foregoing objects and in accordance with the purpose of the invention, as embodied and broadly described herein, a self-heating individual meal module is provided which comprises a tray having a main compartment, an electrolytic-solution-activated, exothermic-chemical pad disposed in said main compartment in said tray, a pouch disposed in said main compartment in said tray beside said electrolytic-solution-activated, exothermic-chemical pad, an electrolytic solution in said pouch, a pull-tab attached to said pouch and arranged so as to create an opening in said pouch when pulled, and a tub for holding food to be heated disposed in said main compartment in said tray above and in contact with said electrolytic-solution-activated, exothermic-chemical pad, whereby, pulling said tab will produce an opening in said pouch causing said electrolytic solution to flow out of said pouch and contact said electolytic-solution-activated, exothermic-chemical pad producing thereby an exothermic reaction to heat said tub.

One feature of the present invention is that the self-heating meal module is constructed so that the electrolytic-solution-activated, exothermic-chemical pad is disposed directly in contact with the tub containing the food to be heated. The result of this arrangement is that the tub is heated by conductive heat transfer of a liquid, i.e. the electrolytic solution. This form of heat transfer is more efficient than the heat transfer mechanism typically utilized in existing self-heating meal modules, i.e, convective heat transfer of steam.

In a preferred embodiment of the invention, the self-heating individual meal module may further comprise a first paperboard carton in which the tray and tub may be maintained for storage and transport purposes and to provide insulation during the exothermic reaction.

Additionally, a second paperboard carton containing auxiliary materials such as for example, eating utensils and other food items not intended for heating may be glued to the first paperboard carton to form a complete single meal. When consumption of the food contained in the self-heating individual meal module is desired, the two paperboard cartons may be easily separated from one another and then used in their intended fashion.

BRIEF DESCRIPTION OF THE DRAWINGS

In the drawings wherein like reference numerals represent like parts:

FIG. 2 is a plan view taken from the top of the tray portion of the removable sub-assembly of the self-heating individual meal module shown in FIG. 1; and FIG. 3 is a section view of the removable sub-assembly of the self-heating individual meal module shown in FIG. 1.

DETAILED DESCRIPTION OF PREFERRED EMBODIMENTS

Figure 1:
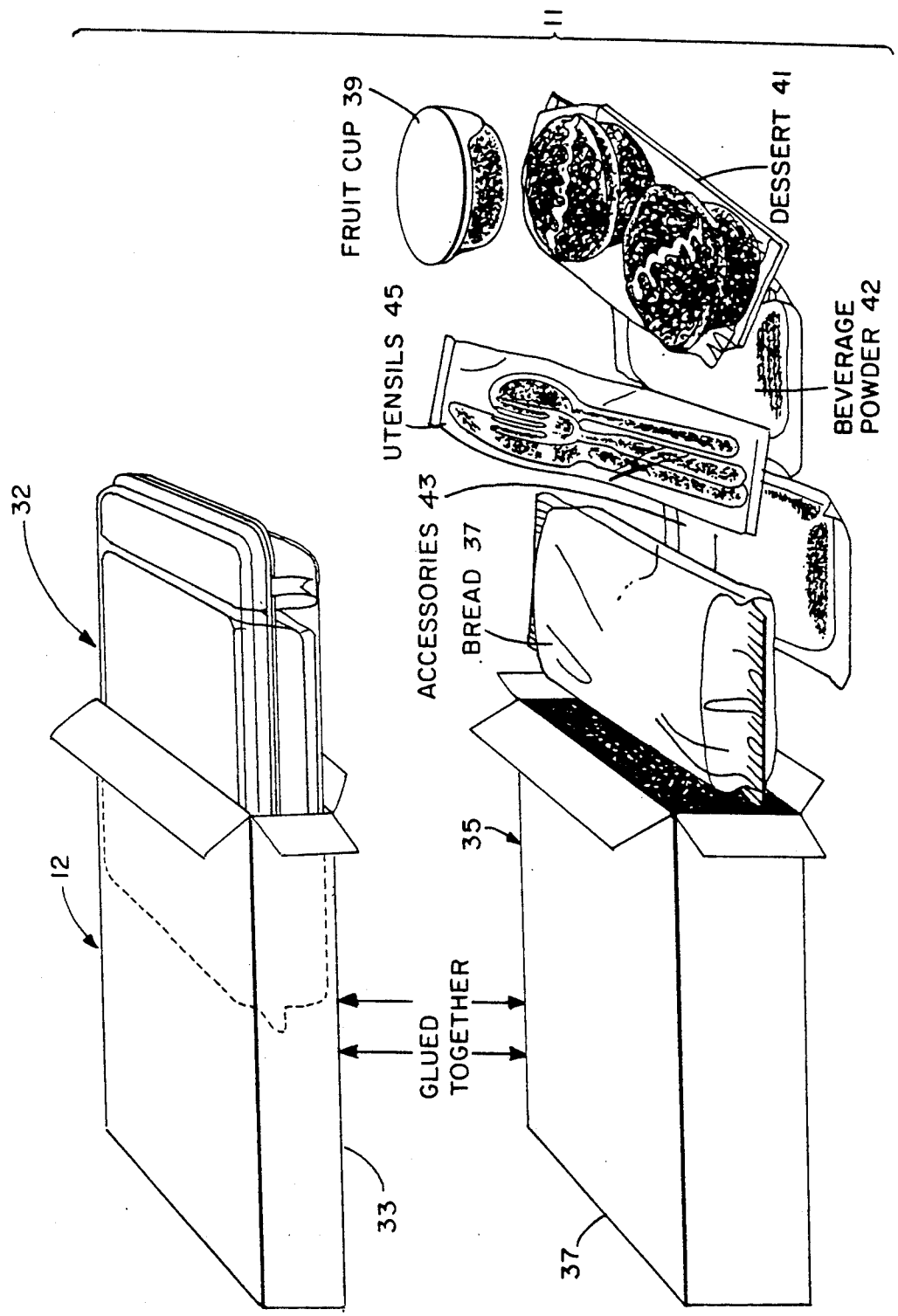
FIG. 1 is a pictorial representation of a self-heating individual meal module constructed according to the teachings of the present invention.

Referring now to the drawing, there is shown in FIG. 1 a self heating individual meal module constructed according to the teachings of the present invention, the module being identified by reference numeral 11.

Self-heating individual meal module 11 includes a first module portion 12.

First module portion 12 includes a generally rectangularly shaped tray 13 for holding materials for producing heat and a generally rectangularly shaped tub 15 for holding a quantity of food 16 to be heated, tray 13 being shown in FIG. 2 and FIG. 3 and tub 15 being shown in FIG. 3.

Tray 13 is thermoformed from 0.045 inch thick polypropylene and includes a main compartment 14. Tub 15 is 0.045 inches thick and is constructed of coextruded polypropylene with an ethylene vinyl alcohol (EVOH) barrier. The top of tub 15 is sealed off with a lid 17 which is a multiple ply laminate material. Lid 17 may be for example, a layer of a polyester on top of a layer of aluminum foil which in turn is on top of a layer of polypropylene. The approximate outside dimensions of tray 13 are 8.38 × 5.62 × 1.00 inches. The inner dimensions of tub 15 are approximately 6.50 × 4.75 × 0.75 inches. Tub 15 has a 0.25 inch flange 18 on three sides and 1.25 inches for the fourth side. Tub 15 is seated in tray 13 and is continuously welded to tub 15 at their perimeters.

A heater element in the form of an electrolytic-solution-activated exothermic-chemical pad 19 is disposed in main compartment 14 of tray 13 and secured to tray 13 by glue (not shown) or any other suitable material. Pad 19 is a generally rectangularly shaped lightweight (i.e. 25 grams) composite material consisting of a supercorroding Mg-Fe alloy dispersed throughout a porous polymeric matrix. These materials are blended and then formed into a pad by heat sintering. The dimensions of pad 19 are 5.50 × 3.75 × 0.125 inches. When activated by 2 fluid ounces of an electrolyte, pad 19 will yield approximately 150 BTU's of energy. Pad 19 may be for example the type of pad described in U.S. Pat. No. 4,522,190.

An elongated pouch 21 is disposed in main compartment 14 of tray 13 beside pad 19. Pouch 21 is filled with a minimum of 2 ounces of electrolytic solution 23.

Pouch 21 is constructed of an unpigmented, type 1 (general purpose, class H (high density) polyethylene with a thickness of 0.0015 inches. Pouch 21 is side welded with the side seals (0.125 inches maximum) oriented parallel to the machine direction. Two 0.05 × 10.0 inch pull-tab strips are heat sealed to the inner faces of pouch 21, along the center of pouch 21 and parallel to the machine direction. Dimensions of pouch 21 when empty are approximately 5.0 inches × 2.25 inches. The bottom seam of pouch 21 has a minimum seal width of 0.75 inches. Two tear notches 26 are placed halfway through this seal, 0.5 inches from either side of the pouch. When assembled, the pull-tab strips of pouch 21 come together to become pull-tab 27 and are heat sealed to this bottom seal between notches 26, with the long end of pull-tab 27 perpendicular to the bottom seal direction. The end of pouch 21 includes anchor tabs 28 adjacent to the tear notches 26 that extend between the flanges of tray 13 and tub 15 providing a secure anchor after welding tray 13 to tub 15 from which the pull tab 27 can be pulled. Pull-tab 27 extends through a slot 31 in the 1.25 inch side of the tub 15.

Electrolytic solution 23 is a mixture of water, sodium chloride, propylene glycol and adipic acid. The sodium chloride when mixed with the water forms the electrolyte necessary to activate pad 19. The propylene glycol serves as an antifreeze and the adipic acid serves to eliminate the precipitate from the chemical reaction that takes place.

As can be seen, pad 19 is in intimate contact with the bottom of tub 15 so that tub 15 is heated by conductive heat transfer of a liquid i.e. the electrolytic solution.

Tray 13 and tub 15, which together form a subassembly 32, are removably seated in a carton 33 made of a water-resistant paperboard and having sealed ends. Carton 33 serves as protection during transport and storage as well as insulation during the heating process. The inside dimensions of carton 33 are 8.50 × 5.62 × 1.00 inches. Tray 13 has five 0.50 inch diameter × 0.06 inch integrally formed pads 34 on its outer bottom surface to separate it from carton 33 providing an insulating dead air space during the heating process.

Self heating individual meal module 11 also includes a second module portion 35.

Second module portion 35 contains the supplemental items necessary to form a complete single-serve meal. Module portion 35 comprises individually packages shelf-stable items including bread 37, fruit 39, and dessert 41. These items as well as beverage powder 42 and an accessory packet 43 are packaged in pouches constructed of a 3-ply laminate material. Accessory packet 43 contains single-serve packages of coffee, sugar, cream substitute, and salt. There are also matches, toilet tissue, gum, hot pepper sauce, and a towelette. Utensil packet 45 includes a fork, knife, spoon, and napkin packaged in a 1.5 mil., clear, high density polyethylene bag. The supplemental items are packaged in a carton 37 of the same material as carton 33 and of size sufficient to accommodate these items.

Cartons 33 and 37 are preferably glued together but easily separated when so desired.

Module 11 has a relatively simple procedure for usage. If it is to be carried for later consumption, the two. module sections can be separated and the second module portion can be disassembled and placed in convenient pockets so that it takes up less space. When the user is ready to eat, the top right flap of the carton 33 is opened and subassembly 32 is removed about half-way. The top of tub 15 is then held flat by the left hand of the user, and pull-tab 27 pulled gently towards the user with the right hand. Pull-tab 27 should be pulled until it separates from subassembly 32. This procedure releases the activating solution from its pouch 21 and allows it to make contact with the heater pad 19 and tub 15. Subassembly 32 is then slid back into the paperboard carton 33, and the SHIMM laid flat for the ten minutes required for the entree to get hot. Alternatively, first module portion 12 can be placed in a coat pocket in an upright position, provided that the pull tab slot is oriented up. After ten minutes (depending on the ambient air temperature), subassembly 32 can be removed from carton 33 and the lid removed. The food is then ready for consumption.

If desired, the sodium chloride can be incorporated into pad 19 rather than the liquid in pouch 21.

What is claimed is:

1. A self-heating individual meal module comprising:

a tray having a top surface with a food receptacle tub formed therein for holding food to be hated by said module, said tray further having a compartment below said top surface of sufficient dimensions to contain an exothermic chemical heater pad and an activator material pouch when they are disposed in a side by side relationship, an exothermic chemical heater pad disposed in said compartment immediately adjacent the bottom of said tub, whereby heat from said heater pad is transferred directly into the bottom of said tub without having to traverse any intermediate thermal barriers, an activator fluid pouch disposed in said compartment separate from and beside said exothermic chemical heater pad, and means for rupturing said pouch to cause activator fluid escaping therefrom to contact said chemical heater pad and thereby initiate an exothermic reaction, said pouch containing a sufficient quantity of activator fluid therein such that when said pouch is ruptured, the escaping fluid will also contact the sides and bottom of said food receptacle tub and thereby function as an effective heat transfer medium to said tub.

* * * * *